Nov. 22, 1955 — E. M. BURDICK — 2,724,648
METHOD OF PROCESSING CITRUS PULP
Filed Oct. 8, 1951 — 2 Sheets-Sheet 1
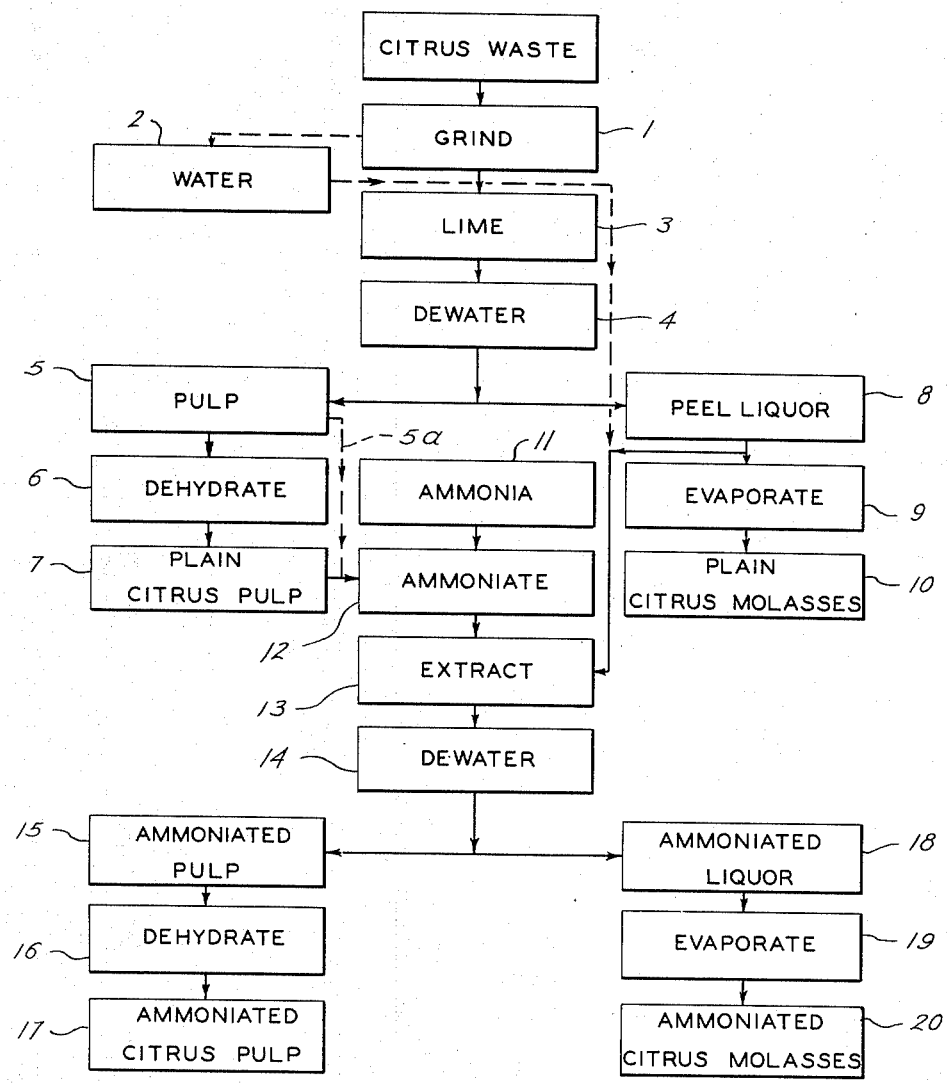
EVERETTE M. BURDICK
INVENTOR.
BY Lester B. Clark &
B. R. Pravel
ATTORNEYS

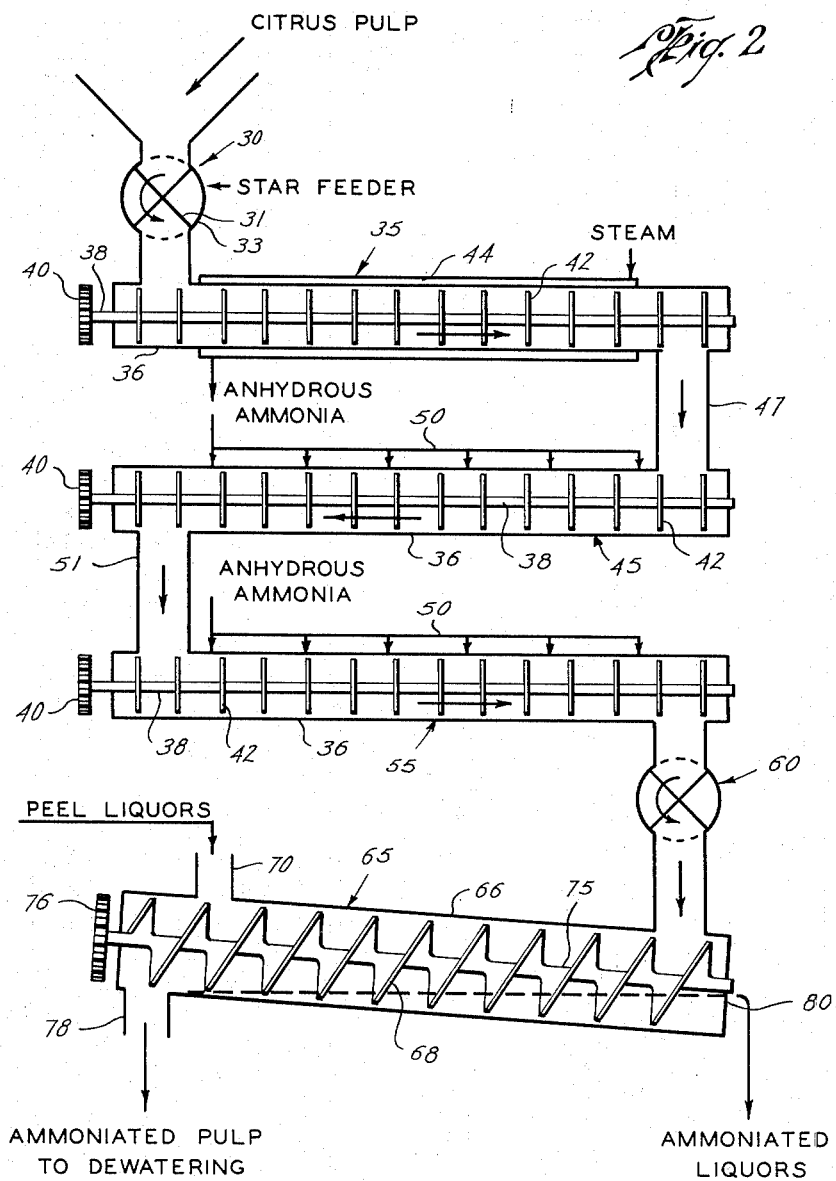

United States Patent Office 2,724,648
Patented Nov. 22, 1955

2,724,648

METHOD OF PROCESSING CITRUS PULP

Everette M. Burdick, Weslaco, Tex.

Application October 8, 1951, Serial No. 250,356

13 Claims. (Cl. 99—2)

This invention relates to an improved citrus pulp and an improved citrus molasses, and a method of preparing same. This invention is particularly concerned with a high crude, partially synthetic protein or high nitrogen content citrus pulp and citrus molasses, and a process for preparing same.

Citrus pulp is manufactured from cull citrus fruit and such waste materials as the peel, rag and seed, which results from the commercial citrus processing in the citrus producing areas of the United States. In the past, the citrus pulp has been utilized with considerable success as a livestock feed, in some instances, as a high organic fertilizer.

Modern methods of processing citrus fruit have so improved the quality of the processed product during the past few years that a larger and larger proportion of the total United States citrus crop is being processed. This, in turn, accounts for the ever increasing volume of citrus pulp and citrus molasses being produced from the otherwise waste materials of this industry. Both the citrus pulp and the citrus molasses have proven to be effective feedstuff, especially for ruminants; for example, the inclusion of citrus pulp in a ruminant's ration improves the general appearance of the animal by giving their coats a sleek and glossy look that is characteristic of good health. However, the use of the citrus pulp and citrus molasses has been limited, largely because of the relatively low protein content thereof. Another, though less important, limitation is the deficiency of phosphorus often found in pulps made in certain citrus producing areas.

Likewise, in the use of citrus pulps as high organic fertilizers, their use has been somewhat limited by the same disadvantage as in the citrus pulp feed, namely, that of having a low nitrogen content.

It is, therefore, one of the main objects of this invention to increase the crude protein or nitrogen content of citrus pulps and citrus molasses in such a way that the added nitrogen, "synthetic protein" or "protein substitutes" may be utilized in a feed for ruminants.

Another main object of this invention is to improve the fertilizer value of citrus pulps and citrus molasses by increasing the nitrogen content thereof in such a manner that the added nitrogen is available to plants.

Another object of this invention is to increase the phosphorus content of the citrus pulps and citrus molasses.

Another object of this invention is to provide a high crude protein or nitrogen content citrus pulp by the ammoniation of citrus pulps.

Another object of this invention is to provide a high crude protein or nitrogen content citrus pulp and citrus molasses by ammoniating citrus pulp with anhydrous ammonia.

Another object of this invention is to provide a high crude protein or nitrogen content citrus pulp by ammoniating citrus pulp with anhydrous ammonia and then treating the citrus pulp with an extracting medium to incorporate with the extracting medium a portion of the "synthetic protein" obtained by the treatment with the anhydrous ammonia.

Another object of this invention is to provide a high crude protein or nitrogen content citrus pulp and citrus molasses with anhydrous ammonia and then extracting with acidified water or citrus peel liquor, so that a portion of "the synthetic protein" obtained by the ammoniation of the citrus pulp is incorporated with the acidified water or peel liquor used in the extracting step.

Another object of this invention is to produce a "synthetic protein" in citrus pulps and citrus molasses over and above that normally present in citrus waste by treating partially or totally dehydrated citrus pulp with anhydrous ammonia at a pressure from zero to five pound guage pressure and then treating the ammoniated citrus pulp with an extracting medium, such as acidified water or peel liquor which is adjusted to a pH between five and seven, so as to incorporate with the water or peel liquor, a portion of the "synthetic protein" formed by the ammoniation of the citrus pulp and thereafter to dehydrate the ammoniated water or peel liquor to produce an ammoniated citrus molasses as well as an ammoniated citrus pulp.

Another object of this invention is to provide a method in which "synthetic protein" is formed in citrus pulp and citrus molasses by the ammoniation of citrus waste and thereafter to extract from the ammoniated citrus pulp an ammoniated extracting solution obtained by the addition of an acidic water or peel liquor, the pH of which has been adjusted to seven or lower by the addition of a non-toxic acidic material such as phosphoric acid, carbonic acid, citric acid, or the calcium and potassium salts of these acids to not only extract a portion of the "synthetic protein" from the ammoniated citrus pulp, but also to neutralize any excess ammonia present in the free state after the ammoniation step, and to additionally increase the phosphorus content of the ammoniated product when the phosphoric acid is used as the acidic material.

Other and further objects of this invention will become apparent when the following description is considered in connection with the accompanying drawings.

Fig. 1 of the drawings is a flow sheet type of illustration of the process of this invention, wherein the solid line indicates the normal steps used in this process and dotted lines are used to indicate the possible alternate steps which may be used or omitted during the normal process of this invention.

Fig. 2 illustrates a typical continuous ammoniator apparatus which can be used in carrying out the process of this invention.

In the past, several methods have been used to produce citrus pulp and citrus molasses from citrus waste materials by the partial dehydration of the citrus waste. However, previous methods have done nothing toward chemically improving the nutritional value of citrus pulps and citrus molasses. In the previous methods the citrus materials, such as culls, peels, rags (inner membranes), and seeds have been treated with an alkaline reagent, such as lime to coagulate the pectic substances and to permit a separation of the wet product into a pulpous portion and a peel liquor. Subsequently, the pulpous portion has been dried in a rotary kiln to make citrus pulp and the peel liquor has been evaporated to make citrus molasses. The prior art methods commonly practiced in the industry differ not only in the methods of liming, but also differ primarily in their mode of separating the pulpous portion and the peel liquor. These methods have developed in the different areas of citrus production as a result of the peculiar economies of the various regions.

The two methods most widely used are commonly referred to as "drainage method" and the "pressing method," because of the different dewatering or separating operations. For example, the former uses large drain bins, while the latter uses mechanical presses. These two methods produce citrus pulps having slightly different chemical composition, whereas the citrus molasses has practically identical composition with regard to carbohydrate and protein content. The difference in chemical composition of the citrus pulps produced by these methods is primarily a result of the original composition of the citrus waste and of the economic factors involved, and is not due to a deliberate attempt to control, alter, or otherwise improve the chemical composition of the citrus pulp or the citrus molasses. Following is a material balance for each of the previously known methods which serve to illustrate the limitations of the previous processing of the citrus pulp for feeds and for fertilizers.

With the present citrus extraction equipment, about 957 pounds of juice are obtained from each ton of grapefruit processed. This leaves approximately 1043 pounds of peel, rag and seed that must be processed into by-products regardless of the method used. The 1043 pounds of this wet material contains about 193 pounds of dry matter, equivalent to 18.5% by weight. Dewatering by the "drainage method" yield only 196 pounds of peel liquor containing 23.5 pounds of dry matter equivalent to 12° Brix and 1.175 pounds of crude protein material which upon evaporation will make 32.6 pounds of 72° Brix citrus molasses containing 3.6% crude protein. On the other hand, dewatering by using mechanical presses to a moisture content of 65% will yield 749 pounds of peel liquor containing 90 pounds of dry matter, equivalent to 12° Brix and 4.5 pounds of crude protein which upon evaporation will make 125 pounds of 72° Brix citrus molasses containing 3.6% crude protein. Thus, approximately 3.8 times as much peel liquor or molasses is obtained by pressing as by the draining method.

Most operators using the presses discard the peel liquor into the sewer, and thus effect considerable savings unless prohibited by the authorities for causing pollution. It has only been the past few years that citrus molasses could be sold at a profit, and even now in some localities the sales do not always repay the manufacturing cost largely because of its low protein content, and low fermentability. The submerged combustion process of Burdick and Allen in the U. S. Patents 2,525,645 and 2,563,705, have overcome many difficulties connected with the citrus molasses manufacture, distribution, and marketing, but the process of this invention due to its increased nitrogen or protein content makes the citrus molasses of even more value.

With regard to the pulpous material obtained by these two previously known methods, the drainage method yields a total of 847 pounds of pulpous material containing 169.5 pounds of dry matter, of which 10.2 pounds are crude protein and 18.8 pounds are fiber. When this pulp is dehydrated to 10% moisture content it will produce 188 pounds of citrus pulp containing 5.45% crude protein and 10% fiber. On the other hand, the pressing method will yield only 294 pounds of pulpous material which contains 103 pounds of dry matter of which 6.875 pounds are crude protein and 18.8 pounds are fiber. When this pulp is dehydrated to 10% moisture it will produce only 104.6 pounds of citrus pulp containing 6.0% protein and 18% fiber. It is quite apparent that only a minor difference in protein content is effected by using either of the two known methods, while the biggest change is noted in the fiber and carbohydrate fractions. Carbohydrate of feed-stuff is commonly called "nitrogen-free-extract" and is determined by subtracting the sum of the protein, fat, ash, and moisture contents from 100%, providing the ash, moisture, and fat contents remain constant. Citrus pulp produced by the drainage method will contain about 8.55% more "nitrogen-free-extract" or carbohydrate material than those produced by the pressing method. The method of drying slightly influences the composition; for example, pulps made in direct fired kilns generally will have a lower fiber content than those made in steam tube kilns. Apparently some of the fiber material is actually burned out when using the direct fired kiln.

It should be noticed that both of these methods produce the same amount of crude fiber, crude protein, carbohydrate, etc., provided total recovery is practiced. The amounts are limited to those originally present in the citrus waste starting material. Previous methods as can be seen from the above have done nothing toward chemically improving the nutritional value of the citrus pulp and the citrus molasses.

However, in the present process, the nitrogen or crude protein content of both citrus pulp and citrus molasses are improved by chemical means in such a way that they are superior feedstuffs and fertilizers. As for feedstuff it is generally accepted that good cattle rations should contain approximately 10 to 12 percent crude protein and dairy rations about 14 percent crude protein. The most widely used grains barely meet the protein requirement for cattle rations and thus must be supplemented by protein concentrate for this purpose as well as for dairy rations. Since the presently known citrus pulps contain only about 5.5 to 6.5 percent crude protein, they too, must be supplemented by some source of more highly concentrated protein.

Reference is hereby made to the U. S. patent application, entitled, "Improved Citrus Pulp and Methods of Processing Same," Serial No. 250,357 filed October 8, 1951, which is to be incorporated and forms a part of this application. That U. S. patent application, Serial No. 250,357 shows how the nitrogen content and thus the crude protein content of citrus pulp can be increased to produce either a balanced ruminant ration, a protein concentrate, or a fertilizer. Data was also presented in that patent application to show that the added nitrogen can serve as a source of protein for ruminants. The present process of this invention is an improvement on the patent application, above referred to, and in this process not only the nitrogen content of citrus pulps can be increased, but also the nitrogen content of citrus molasses can likewise be increased in such a way that it is also available to ruminants as a source of protein.

The process of this invention is briefly, the steps of treating citrus pulps, partially or totally dehydrated, with anhydrous ammonia, and thereafter extracting the treated citrus pulp with an extracting medium, such as, acidified water or peel liquor and thereafter dewatering to produce an ammoniated pulpous stream and an ammoniated peel liquor stream followed by dehydration of both streams to produce ammoniated citrus pulp and ammoniated citrus molasses, both of which have an increased crude protein content obtained by the ammoniation and extraction steps which protein content includes a "synthetic protein" or "substitute protein" which is an amount over and above the natural protein originally present in the citrus pulp.

The present invention offers numerous advantages heretofore unknown, among which are the increasing of the nitrogen or crude protein content of both citrus pulp and citrus molasses, the control of the amount of protein of both the citrus pulp and the citrus molasses by utilizing the extraction and in some instances the dewatering step following that, and additionally the extraction with an acidic agent provides a method of removing the excess ammonia or of forming the excess ammonia in situ within the citrus product and in cases wherein phosphoric acid is used the phosphorus content of the ammoniated product is also increased.

The process of this invention can be seen in detail by viewing the flow sheet for the process shown in Fig. 1. The starting material for the process of this invention is citrus waste which is that material obtained by the known methods of processing citrus fruit for the extraction of the juices therefrom. The first step of the process is shown at 1, wherein the citrus waste is first ground to relatively small particles in a grinding apparatus such as a hammer mill. If desired, the step 2 may be performed by the washing of the small particles obtained from the grinding step 1 to obtain a water extract of the free citric acid, however, this water extracting step 2 is not necessary in this process although as will be explained later, the water extract obtained in this step 2 may be subsequently used. Preferably the small particles will be treated after the grinding step 1 with lime, CaO and Ca(OH)$_2$, or other suitable alkaline reagents which includes for example the oxides and hydroxides of the alkaline earths including barium, magnesium and strontium, in addition to the calcium. It is likewise true that salts such as chloride, carbonate, and bi-carbonate of the alkaline earths also work in this process, and in the case when such salts are used some alkali or hydroxide should be used in conjunction with them. The lime or alkaline treatment in step 3 facilitates the ready separation or dewatering step 4 which may be performed by using either the presses or the drainage bins as previously explained in connection with the prior art.

Whether or not the pressing method or the drainage method is used as the step 4, will determine the extent of separation of the citrus waste into a pulpous portion and a peel liquor portion as has been previously explained. Thus the pulpous portion indicated as passing to the stage 5 on the flow sheet will be partially dehydrated at this stage. In some instances the step 5 of transferring the pulp to its indicated point for subsequent dehydration by the step 6 may be eliminated and in that case the alternate direct feed step 5A from the dewatering step 4 will be carried out directly to the ammoniation step 12.

If it is desired to totally dehydrate the citrus pulp, then the pulp can be taken from the step 5 to the dehydration step 6. The dehydration step 6 can be carried out in any of the known dehydration apparatus, such as, for example, direct fired kilns or steam kilns. The resulting product from the dehydration step 6 is a plain citrus pulp 7 which has been totally dehydrated. It will be appreciated, of course, that the extent of the dehydration will be determined by the length of time and temperatures used largely, so that the plain citrus pulp indicated as step 7, in some instances may not be entirely totally dehydrated, but it is preferably carried to a moisture content of 10% or less. The peel liquor 8, obtained from the dewatering step is evaporated in step 9 and the evaporation is preferably carried out by using the submerged combustion process of the patent Burdick and Allen, above referred to, and then finally evaporated to the desired concentration with standard multiple-effect evaporators.

The resulting product from the evaporation step 9 is the plain citrus molasses 10. Thus, the process as outlined by the flow sheet of Fig. 1 permits the manufacture of the plain citrus pulp 7 and the plain citrus molasses 10, which product may be later combined with the ammoniated citrus pulp and ammoniated citrus molasses to obtain a protein content of a desired quantity. An ammonia supply is provided at 11 and this ammonia is fed to the ammoniator apparatus to carry out the ammoniation step 12 on either the pulp as it comes from the dewatering step 4 or on the plain citrus pulp 7. The ammonia 11 is an anhydrous ammonia and is preferably fed to the ammoniation apparatus in gaseous form. The ammonia is ordinarily stored in a large pressure cylinder under about 100 to 200 pounds pressure, depending upon its temperature. Liquid ammonia is metered out through a pressure resisting valve to about two pounds pressure. This liquid ammonia is then vaporized by passing through a heat exchanger and finally introduced into the ammoniation apparatus where the pressure is essentially atmospheric or at most a few inches of water pressure. Although the gaseous anhydrous ammonia is ordinarily used in the process of this invention it is true that since the preferred operational pressures are within a range of from atmospheric to about 5 pounds guage pressure that due to the vapor pressure of the liquid ammonia, the liquid ammonia will at the temperatures of operation of the ammoniation step vaporize within the ammoniation apparatus so that in effect a gaseous anhydrous ammonia results during the ammoniation step. Due to the vapor pressure of ammonia at the higher temperatures used in this process it would be necessary to use a high pressure in order to have the reaction proceed with liquid ammonia and to prevent its vaporization, but one of the great advantages of this invention is that the process can be carried out at substantially atmospheric pressure so that expensive super atmospheric equipment is not required.

The ammoniation apparatus used in this invention may be of the batch feed type, such as described in the U. S. patent application, Serial No. 250,357, above referred to, or it may be in the continuous ammoniation apparatus illustrated somewhat diagrammatically in Fig. 2 of the drawing. To minimize loss of ammonia, the citrus pulp is fed into the star feeder 30, which is essentially a star shaped rotating paddle 31, which is actually mounted in a cylindrical housing 33. The citrus pulp passes from the star feeder 30 into the first ammoniator 35, which is made up of a cylindrical type section 36, having mounted therein a shaft 38 which is rotated through a chain driven sprocket 40 connected thereto within the pipe section or cylinder 36 and located on the shaft 38 are feeding paddles 42, which are set at an angle to the shaft 38 so as to effect the horizontal movement of the citrus pulp through the ammoniator as indicated by the arrow therein. In some instances it may be desirable to pre-heat the citrus pulp prior to adding the anhydrous ammonia. This pre-heating can either be accomplished by taking the citrus pulp from the dehydration process directly so that there is a residual heat within the pulp, but in some cases the citrus pulp will necessarily be stored and permitted to cool prior to ammoniation step and therefore it is possible to heat the citrus pulp by using a steam chest 44. If the additional heating by steam chest 44 is not used in the process, then the anhydrous ammonia may be added in the first ammoniator 35 and in some cases may be added even though the steam chest 44 is required, but in the apparatus as illustrated in Fig. 2 the citrus pulp passes from the first ammoniator 35 to the second ammoniator 45 through a pipe 47. In the second ammoniator 45, the paddles 42 on the shaft 38 driven by a chain driven sprocket 40 are used in the same manner as in the first ammoniator 35 with the horizontal movement of the citrus pulp being in the opposite direction from that used in the ammoniator 35. Anhydrous ammonia is introduced into the second ammoniator 45 through the manifold 50 so that distribution of the ammonia is obtained throughout the ammoniator 45. The paddles 42, since they are set at an angle and may constitute numerous paddle units, serve not only to provide the horizontal movement, but in addition will cause a lifting and mixing action on the citrus pulp so that adequate surface contact of the anhydrous ammonia with the citrus pulp is obtained. At the end of the ammoniator 45 is a second connecting pipe 51 which feeds into the third ammoniator 55, which is of similar construction to the second ammoniator 45 having the paddle 42 on the shaft 38 operated by the chain driven sprocket 40 and providing a horizontal movement in the same direction as that obtained in the first ammoniator 35. Likewise, the anhydrous ammonia is fed through a manifold 50 as in the second ammoniator 45. At the discharge end of the third ammoniator 55 is a second star feeder 60 which is of identical construction with the star feeder 30 used for introducing the citrus pulp, and likewise also prevents the loss of ammonia from the apparatus. Actually the continuous ammoniator apparatus of Fig. 2 is preferably gas tight or at least semi-gas tight to prevent the loss of ammonia throughout, However, expensive pressure equipment which would be necessary if the process were operated above the atmospheric to 5 pounds pressure range preferred in this invention is not necessary. The chain driven sprocket 40 and the star feeders 30 and 60 are synchronized by a chain drive or similar drive so that they are operating at a proportionate desired rate of speed.

After the ammoniation step 12 there is still present in the ammoniated citrus pulp some free or unreacted ammonia. This free or un-reacted ammonia give out not only a product of undesirable odor, but would also be harmful to ruminants if fed as such and finally unless utilized the loss of ammonia would be wasteful. In order to de-ammoniate the ammoniated citrus pulp, that is to remove or to chemically change the free ammonia within the ammoniated citrus pulp so as to prevent the above enumerated disadvantages of its presence, the de-ammoniation step can include the passing of air or flue gasses or carbon-dioxide over the ammoniated citrus pulp. When the variation of the method employing aeration is used, the free ammonia will be removed from the citrus pulp while when treating with the flue gases or the carbondioxide gas there will be formed in situ the compounds of ammonium carbonate and/or ammonium bi-carbonate, both of which are utilizable by ruminants as a source of protein as well as being usable for fertilizer.

However, in the process of this invention it has been found that the preferred method of eliminating the disadvantages of the excess uncombined ammonia from the ammoniated citrus pulp is by the addition to the ammoniated citrus pulp of a non-toxic acidifying agent like phosphoric acid and its acidic salt of potassium or calcium. When using the phosphoric acid or its acidic derivative the uncombined excess ammonia in the citrus pulp is neutralized in addition to increasing the phosphate content of the citrus pulp which is desirable in order to make a balanced feed and which is also suitable for increasing the mineral content of fertilizer. If desired, other non-toxic acidic material can be used for combining with the free ammonia, for example, citric acid is a suitable acidic material for this purpose.

After the ammoniation step 12 and if desired after the de-ammoniation step not shown but above described, the extraction step 13 is carried out. Ordinarily, however, in this invention one of the advantages present is that the de-ammoniation step is not necessary after the ammoniation step 12 because it can be combined with the extraction step 13 as will be described hereinafter. The extraction step 13 is carried out by the addition of an extracting medium to the ammoniated citrus pulp obtained by the ammoniation step 12. This extracting medium can take various forms but the main purpose of the extraction step is to extract from the ammoniated citrus pulp a portion of the nitrogen content imparted thereto in the form of "synthetic protein" or "substitute protein" which has been added over and above that originally present in the citrus waste by the ammoniation step 12, as an example of the extracting medium which can be used in the extracting step 13, the water extract 2 of the free citric acids obtained after the grinding step 1 as indicated on the flow sheet can be used, in which case a portion of the "synthetic protein" present in the ammoniated citrus pulp will be incorporated with the water extract 2. Also the peel liquor obtained in step 8 as shown on the flow sheet or a mixture of the peel liquor 8 and the water extract 2 may be used as the extracting medium. Whatever extracting medium is used, the medium should be acidified so that the pH after mixing the extracting medium with the ammoniated citrus pulp will be adjusted to 7 or lower and preferably within a range of 5 to 7 inclusive. This adjustment of the pH below 7 is necessary to prevent loss of ammonia through decomposition volatilization. The acids which may be used for the adjusting of the pH are, for example, any non-toxic acidic material like phosphoric acid, carbonic acid, citric acid, acetic acid, and the calcium and potassium salts of these acids. As previously mentioned in connection with crystallation of the excess uncombined ammonia, the use of phosphoric acid is particularly desirable because it raises the phosphorus content of the ammoniated product. It should also be pointed out that a citrus molasses can be made from the dehydrated citrus pulps alone without the use of the peel liquors as the extracting mediums, for example, in the Example 4 which follows herein, water alone was used as the extracting agent.

The extracting step may be carried out in an apparatus of the type illustrated in Fig. 2 which is shown as an extracting apparatus 65. Thus the ammoniated citrus pulps are fed from the star feeder 60 into the extracting apparatus 65 at the right hand end of a cylinder 66 as shown in Fig. 2 within the extracting cylinder 66 may be located a screw type conveyer or similar mixing device 68 which moves the solid pulp to the left of the sheet of drawing. The peel liquors are preferably added through an inlet pipe 70 at the opposite end of the cylinder 66 from the star feeder 60 so that there is a countermovement of the citrus pulp and the peel liquors or other extraction medium entering through the inlet pipe 70. The screw conveyor 68 is located in position on a shaft 75 which is operated by a chain driven sprocket 76, which if desired, may be connected with the chain driven sprocket 40 and the star feeders 30 and 60 for synchronization, although this will not be necessary. The ammoniated liquors due to the tilt of the extracting apparatus 65, as shown in Fig. 2 will drain from the right hand end of the extractor 55, whereas the ammoniated pulp will exit through an outlet pipe 78. As the ammoniated liquors are discharged at the lower level 80, a screen may be used at 80 to prevent the solids from passing out of the discharge opening 80 along with the ammoniated extracting medium or liquors.

It should be pointed out that in the ammoniation step 12, that the amount of anhydrous ammonia added per unit of citrus pulp during that step will determine largely the amount of "synthetic protein" produced. Also, the amount of the "synthetic protein" which is incorporated with the extracting medium can be varied and controlled by varying and controlling the volume of the extracting liquor or medium as will be apparent from Examples 5 and 6, which follow herein; also, the particular extracting medium being used will determine to some extent the amount of "synthetic protein" which is incorporated with the extracting medium and the amount which is left in the ammoniated citrus pulp. Ordinarily after the extracting step 13 the slurry produced in that extracting step 13 will be dewatered by either the pressing method or the drainage method previously described and as was carried out in step 4 of this process as shown in Fig. 1. This second dewatering 14 is more readily accomplished than the first dewatering 4 since the ammoniation in step 12 seems to eliminate more of the colloidal and gel-like properties of the citrus peel. The dewatering operation 14 produces ammoniated citrus pulp stream 15 and an ammoniated liquor stream 18. However, the amount of each which is contained can be controlled by the amount of the extracting mediums used as well as by whether or not the dewatering step 14 is used, as will be rendered apparent when a comparison of the Examples 7 and 8 which are set forth herein. Thus, it can be seen from the Example 7 which follows that when a small volume of the extracting medium or liquor was used all of the "synthetic protein" and the entire product in fact was in the form of ammoniated citrus pulp, whereas, in Example 8 which follows it can be seen by using the dewatering step, more of the "synthetic protein" is made to appear in the ammoniated citrus liquor or ammoniated molasses. The ammoniated citrus pulp can be dehydrated in step 16 in a manner similar to that employed in step 6 to thus produce the final ammoniated citrus pulp 17 which contains the "synthetic protein" or nitrogen material which is available to ruminants for feeding and to plants, and which is over and above that which is present in the original starting citrus waste, or even in the plain citrus pulp produced in step 7. The ammoniated liquor 18 may be evaporated as indicated at step 19 to form the ammoniated citrus molasses 20. This ammoniated citrus molasses likewise has an increased crude protein or nitrogen content which is available to ruminants as a feed, and which is also available to plants as a fertilizer. As previously mentioned, the plain citrus pulp 7 can be combined with the ammoniated citrus pulp 17 in order to regulate the precise amount of crude protein present in the live stock feed or fertilizer. Likewise, the plain citrus molasses 10 may be mixed with the ammoniated citrus molasses 20 to form a molasses having a particularly desirable protein or nitrogen content.

As previously mentioned, one of the advantages of this invention has been the discovery that the ammoniation process can be satisfactorily carried out at substantially atmospheric pressures, and although pressure in some instances facilitates the reaction, this advantage is more than off set by the necessity of using costly pressure equipment which would be unnecessary in the use of atmospheric pressures as in the process of this invention. As for the temperatures of the reaction, the ammoniation is most conveniently conducted at elevated temperatures around 170° to 225° F. However, the temperatures of operation are not limited to this range and the reaction may actually be carried out within a range from normal room temperature (60° F.) to about 245° F., which is the temperature at which citrus pulp begins to char. It is believed readily apparent from Example 1 as follows that the ammoniation reaction is sufficiently rapid at temperatures as low as 65° F., and that the heated reaction alone due to its exothermic nature is enough to raise the temperature of the reacting mass to produce a product containing 2.6% nitrogen.

*Example 1.*—The ammoniator was charged with 100 pounds of molasses added citrus pulp and treated accordingly to the following schedule with anhydrous ammonia at substantially atmospheric pressure:

|  | Time, Minutes | Temperature of— | |
|---|---|---|---|
|  |  | Lower Thermometer | Upper Thermometer |
| Ammonia added for 4 min | 0 | 65 | 65 |
|  | 7 | 113 | 67 |
|  | 15 | 124 | 67 |
| Ammonia added for 2 min | 25 | 150 | 72 |
|  | 30 | 162 | 93 |
| Do | 35 | 170 | 129 |
|  | 60 | 185 | 163 |
| Ammonia added for 1 min | 85 | 193 | 184 |

After deammoniating and oven drying, the sample was analyzed and found to contain 2.6% nitrogen, which is equivalent to 16.25% crude protein. A one to five mixture showed a pH of 6.0.

By using higher temperatures in the ammoniation step 12 it is possible to reduce greatly the time necessary for the reaction to produce a given increase in nitrogen or "synthetic protein" content. Thus, it is preferable to have the temperature of the reaction between 180–200° F. This can readily be done either by passing the partially dehydrated pulp directly as it comes from the kilns and the dehydration process to the ammoniator or by applying additional heat as has previously been mentioned. Temperatures above 245° F. should be avoided unless darkened products are not objectionable as in the case of fertilizer. It has been found that the darker products are less appealing to the eye and less readily eaten by cattle. The nitrogen or "synthetic protein" content of citrus pulps can be increased by as much as 4% or more when the reaction is allowed to proceed for 90 minutes and reach temperatures in excess of 220° F., as shown in Example 2, yet in Example 3, which follows, it was possible to increase the nitrogen content approximately 2% within 10 minutes.

*Example 2.*—The ammoniator was charged with 100 pounds of plain citrus pulp and treated with anhydrous ammonia according to the schedule given.

|  | Time, Minutes | Temperature of— | |
|---|---|---|---|
|  |  | Lower Thermometer | Upper Thermometer |
| Ammonia added slowly for 8 min | 0 | 80 | 80 |
|  | 10 | 168 | 145 |
|  | 15 | 172 | 167 |
| Ammonia added for 3 min | 30 | 183 | 193 |
|  | 60 | 190 | 210 |
|  | 90 | 190 | 224 |

When taken from the ammoniator the sample had a strong odor of ammonia, which was removed by treating with an acidic phosphate and aeration. The de-ammoniated sample was found to contain 5.09% nitrogen, equivalent to 31.8% crude protein.

*Example 3.*—The ammoniator was charged with 100 pounds of dehydrated citrus pulp taken directly off production prior to passing through the cooling drum. It was thus warm when first treated with anhydrous ammonia.

|  | Time, Minutes | Temperature of— | |
|---|---|---|---|
|  |  | Lower Thermometer | Upper Thermometer |
| Ammonia added for 5 min | 0 | 140 | 140 |
|  | 5 | 215 | 140 |
| Ammonia added for 2 min | 10 | 224 | 140 |
|  | 20 | 226 | 216 |
|  | 30 | 225 | 225 |

The sample was freed of its ammonia odor by aeration, and an oven dry sample was found to contain 2.86% nitrogen, which is equivalent to 17.88% crude protein. A one to five water mixture showed a pH of 6.5 and 1.8% or 63% of the total nitrogen was found to be water-soluble and thus extractable.

As can be seen on Example 3, the ammoniation was continued for thirty minutes but the maximum temperature was reached after ten minutes at the lower thermometer and thus the chief exothermic reaction was completed at this time at that point. It can then be assumed that the nitrogen content and crude protein content of the pulp in the region of the lower thermometer had reached the average value reported as being 2.86%. This shorter time was made possible because of the fact that the pulp was initially at 140 degrees F. It thus appears that although it may be possible to operate the ammoniation step at higher pressures than atmospheric and at temperatures above 225° F. that superior products can be obtained within the range of 180–220° F. at atmospheric pressure. Products containing between 2% and 5% nitrogen content seem to be superior in both color and palatability.

It will be noted that the examples one to three are merely concerned with the ammoniation step and do not comprise the complete process of this invention. Following are Examples 4 to 8 which are illustrative but not limiting with respect to the complete process of this invention.

*Example 4.*—One kilogram of warm citrus pulp (about 150° F. was treated with an excess of anhydrous ammonia gas for a period of two hours in a semi-closed ammoniation vessel at substantially atmospheric pressure. The pulp had taken on a deep golden color and smelled strongly of ammonia when removed from the ammoniation vessel. This was immediately mixed with 4 liters of water and the pH adjusted to 6 by adding 65 milliliters of 50% citric acid. After about 5 minutes mixing, the slurry was separated or dewatered by draining and pressing. Approximately 3860 grams of pulpous material and 1200 milliliters of ammoniated extract were obtained by this operation. The pulpous material was dehydrated to bone dryness in an oven at 103° C. It was then found to contain 884 grams of dry material, which upon analysis showed 4.59% nitrogen, equivalent to 28.7% crude protein. It was a deep brown color and entirely devoid of ammoniacal odor. The extract was concentrated by evaporation to 113 grams of 72 degrees Brix molasses, and analysis showed it to contain 2.78% nitrogen, equivalent to 17.4% crude protein.

*Example 5.*—One hundred pounds of dehydrated citrus pulp was charged to the ammoniator in which it was treated with 4 pounds of anhydrous ammonia gas. During the ammoniation the pressure was maintained at atmospheric, the temperature at approximately 190 degrees F., and the reaction time was very close to 10 minutes. The ammoniated pulp had a bright yellowish-orange color and an ammoniated odor when it emerged from the ammoniator. It was immediately mixed with 400 pounds (about 46 gallons) of 12.2 degrees Brix peel liquor, and 2 pounds of 85% phosphoric acid was added to adjust the pH to 6. After mixing the slurry for a few minutes it was dewatered by means of a press until a total of 196 pounds of 18.5 degrees Brix ammoniated peel liquor was obtained. This left approximately 309 pounds of pulpous material, which when dehydrated to complete dryness yielded 108 pounds of rich brown colored ammoniated citrus pulp, entirely free of ammoniacal odor. Chemical analysis showed the ammoniated pulp to contain 2.64% nitrogen, which is equivalent to 16.5% crude protein. The ammoniated peel liquor was found to contain 36.2 of dry matter of which 1.29 pounds was nitrogen equivalent to 8.06 pounds of crude protein. Thus the solids present were 22.3% crude protein, which means 16% crude protein at 72 degrees Brix molasses.

*Example 6.*—A 100 pound sample of the same citrus pulp used in Example 5 was fed to the ammoniator and treated with 4 pounds of anhydrous ammonia gas just as in Example 5. It was immediately mixed with 700 pounds (about 80 gallons) of 12.3 degrees Brix peel liquor that had been acidified with 1.7 pounds of phosphoric acid. After mixing for a few minutes the slurry was dewatered by means of a press. The dewatering operation produced 505 pounds of 15.7 degrees Brix ammoniated peel liquor, which left about 300 pounds of pulpous material. Analysis of the peel liquor showed it to contain 1.97 pounds of nitrogen, equivalent to 12.3 pounds of crude protein, which indicates that the solids present consisted of 15.5% crude protein, and this would be equivalent to 11.2% crude protein in a 72 degree Brix molasses. The pulpous material when completely dehydrated yielded 102 pounds of dry ammoniated citrus pulp, which contained 2.13% nitrogen, equivalent to 13.3% crude protein.

*Example 7.*—A 100 pound sample of citrus pulp made by the conventional method of grinding the waste peels, etc., and treating with 5–15 pounds of lime per ton of waste to coagulate the pectic substances and permit dewatering as by draining, and finally dehydrated by means of direct fired rotary kilns, was treated with 3 pounds of anhydrous ammonia gas. During the ammoniation the pressure was atmospheric, the temperature was maintained between 180–200 degrees F. Approximately 10 minutes was allowed for the reaction to take place. As it emerged from the ammoniator it was mixed with 100 pounds of 12.3 degree Brix peel liquor that had been acidified with 0.6 pound of phosphoric acid. It was completely absorbed. Dehydration to dryness yielded 105 pounds of brown colored ammoniated citrus pulp that was found to contain 3.22% nitrogen, equivalent to 20.1% crude protein. No molasses was made in this experiment, as all of the protein appeared in the pulp.

*Example 8.*—A 100 pound sample of citrus pulp was treated exactly as in Example 7 with the following exception. Immediately after mixing the peel liquor with the ammoniated pulp it was dewatered by pressing. The dewatering operation yielded only 20 pounds of ammoniated peel liquor, which was found to contain 4.64 pounds of solid material of which 1.9 pounds were crude protein (nitrogen X6.25). Thus on a dry basis it contained 40.9% crude protein, and 29.4% crude protein on a 72 degree Brix molasses basis. The pulpous material was found to contain 3.05% nitrogen on a dry basis, which is equivalent to 19.1% crude protein. A total of 101.3 pounds of dry pulp was obtained.

As has previously been mentioned it can be seen from a comparison of Examples 6 and 7 that different amounts of anhydrous ammonia are used in the ammoniation step when different amounts of "synthetic protein" are produced. Similarly in the extracting step, the effect of varying the volume of the extracting liquor or medium can be seen by comparison of the Examples 5 and 6. A comparison of Examples 7 and 8 illustrates how the dewatering step 14 in this process can affect the distribution of protein material or nitrogenous material between the two products, namely, the ammoniated citrus pulp and the ammoniated citrus molasses; all of the protein material appeared in the pulp when a small volume of liquid as in Example 7, whereas when the pressing step was included as in Example 8 more of the "synthetic protein" or nitrogen material appeared in the molasses.

Broadly, this invention contemplates an ammoniated citrus pulp, and an ammoniated citrus molasses and a process of making same which includes the steps of ammoniating citrus waste materials so as to impart thereto a "synthetic protein" or protein substitute content, which is capable of being incorporated with an extracting medium to form a citrus molasses and in which both the ammoniated citrus pulp and citrus molasses contain a "synthetic protein" or protein substitute which is utilizable by ruminants for nutritional purposes as well as being utilizable as a fertilizer by plants.

What is claimed is:

1. A method of processing citrus waste comprising the steps of grinding the citrus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nutritional purposes, extracting a portion of said protein substitute by adding to said ammoniated citrus pulp a portion of said peel liquor effluent whereby a portion of said protein substitute becomes associated with said peel liquor effluent to form an ammoniated peel liquor, separating said ammoniated citrus pulp and said ammoniated peel liquor, both of said ammoniated citrus pulp and said ammoniated peel liquor having associated therewith a protein substitute available to ruminants for nutritional purposes in addition to the natural protein present in said citrus waste.

2. A method of processing citrus waste comprising the steps of grinding the citrus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nutritional purposes, extracting a portion of said protein substitute by adding to said ammoniated citrus pulp a portion of said peel liquor effluent whereby a portion of said protein substitute becomes associated with said peel liquor effluent to form an ammoniated peel liquor, dewatering the resultant slurry after said extracting to increase the amount of protein substitute in said ammoniated peel liquor, separating said ammoniated citrus pulp and said ammoniated peel liquor, so that both of said ammoniated citrus pulp and said ammoniated peel liquor have associated therewith a protein substitute available to ruminants for nutritional purposes in addition to the natural protein present in said citrus waste.

3. A method of processing citrus waste comprising the steps of grinding the citrus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nutritional purposes, extracting a portion of said protein substitute by adding to said ammoniated citrus pulp a portion of said peel liquor effluent whereby a portion of said protein substitute becomes associated with said peel liquor effluent to form an ammoniated peel liquor, separating said ammoniated citrus pulp and said ammoniated peel liquor, dehydrating said ammoniated citrus pulp to produce a dry ammoniated citrus pulp, and dehydrating said ammoniated peel liquor to produce an ammoniated citrus molasses, both of said ammoniated dry citrus pulp and said ammoniated citrus molasses having associated therewith a protein substitute available to ruminants for nutritional purposes in addition to the natural protein present in said citrus waste.

4. A method of processing citrus waste comprising the steps of grinding the cirtus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nutritional purposes, extracting a portion of said protein substitute by adding to said ammoniated citrus pulp a portion of said peel liquor effluent whereby a portion of said protein substitute becomes associated with said peel liquor effluent to form an ammoniated peel liquor, dewatering after said extracting to increase the amount of protein substitute in said ammoniated peel liquor, separating said ammoniated citrus pulp and said ammoniated peel liquor, dehydrating said ammoniated citrus pulp to produce a dry ammoniated citrus pulp, and dehydrating said ammoniated peel liquor to produce an ammoniated citrus molasses, both of said ammoniated dry citrus pulp and said ammoniated citrus molasses having associated therewith a protein substitute available to ruminants for nutritional purposes in addition to the natural protein present in said citrus waste.

5. A method of processing citrus waste comprising the steps of grinding the citrus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nutritional purposes, extracting a portion of said protein substitute by adding to said ammoniated citrus pulp a portion of said peel liquor effluent whereby a portion of said protein substitute becomes associated with said peel liquor effluent to form an ammoniated peel liquor, adjusting the pH of the resultant slurry after said extracting to within a range from 5 to 7, inclusive, to prevent decompositon and loss of ammonia by subsequent treatment, separating said ammoniated citrus pulp and said ammoniated peel liquor, both of said ammoniated citrus pulp and said ammoniated peel liquor having associated therewith a protein substitute available to ruminants for nutritional purposes in addition to the natural protein present in said citrus waste.

6. A method of processing citrus waste comprising the steps of grinding the cirtus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nturitional purposes, acidifying said peel liquor effluent to form an acidified extracting medium, adding said extracting medium to said ammoniated citrus pulp to extract from said pulp a portion of said protein substitute into said extracting medium and to also neutralize free ammonia remaining in said pulp, so that both of said ammoniated citrus pulp and said ammoniated peel liquor have combined therewith a protein substitute available to ruminants for nutritional purposes in addition to the natural protein present in said cirtus waste.

7. A method of processing citrus waste comprising the steps of grinding the citrus waste into relatively small particles, treating said small particles with an alkaline reagent, thereafter dewatering said small particles to produce a pulpous portion and a peel liquor effluent, ammoniating said pulpous portion by adding thereto anhydrous ammonia to form an ammoniated citrus pulp having therein a substantial amount of protein substitute utilizable by ruminants for nutritional purposes, extracting a portion of said protein substitute by adding to said ammoniated citrus pulp an extracting medium having a pH within a range of 5 to 7, inclusive, so that said extracting medium acquires a portion of the protein substitute content present in said ammoniated citrus pulp.

8. In a method of treating citrus pulp to increase the nutritional value thereof, the steps of treating citrus pulp having substantially all of the water removed therefrom with anhydrous ammonia to form an ammoniated citrus pulp having a protein substitute content available to ruminants for nutritional purposes in addition to the natural protein content present in said citrus pulp, and thereafter adding to said ammoniated citrus pulp an extracting medium having a pH within a range of 5 to 7, inclusive, so that said extracting medium acquires a portion of said protein substitute in said ammoniated citrus pulp and also so that any excess ammonia remaining in the pulp from the ammoniation thereof is neutralized.

9. In a method of treating citrus pulp to increase the nutritional value thereof, the steps of treating citrus pulp having substantially all of the water removed therefrom with anhydrous ammonia to form an ammoniated citrus pulp having a protein substitute content available to ruminants for nutritional purposes in addition to the natural protein content present in said citrus pulp, adding an extracting medium having a pH less than 7 selected from the group consisting of peel liquor and acidified water, and then separating said ammoniated citrus pulp and said extracting medium each of which has combined therewith a portion of said substitute protein.

10. In a method of treating citrus pulp to increase the nutritional value thereof, the steps of treating citrus pulp having substantially all of the water removed therefrom with anhydrous ammonia to form an ammoniated citrus pulp having a protein substitute content available to ruminants for nutritional purposes in addition to the natural protein content present in said citrus pulp, adding an extracting medium having a pH less than 7 selected from the group consisting of peel liquor and acidified water, dewatering the resultant slurry from such extracting step to produce an ammoniated citrus pulp stream and an ammoniated extracting medium stream, said dewatering increasing the protein substitute content of said ammoniated extracting medium over and above that obtained by the extracting step alone.

11. In a method of treating citrus pulp to increase the nutritional value thereof, the steps of treating citrus pulp having substantially all of the water removed therefrom with anhydrous ammonia to form an ammoniated citrus pulp having a protein substitute content available to ruminants for nutritional purposes in addition to the natural protein content present in said citrus pulp, adding an extracting medium having a pH less than 7 selected from the group consisting of peel liquor and acidified water, dewatering the resultant slurry from such extracting step to produce an ammoniated citrus pulp stream and an ammoniated extracting medium stream, said dewatering increasing the protein substitute content of said ammoniated extracting medium over and above that obtained by the extracting step alone, dehydrating said citrus pulp stream to produce a dry ammoniated citrus pulp, and dehydrating said ammoniated extracting medium stream to produce a concentrated protein extract, both of said dry ammoniated citrus pulp and said concentrated ammoniated extract having a protein substitute content available to ruminants for nutritional purposes.

12. In a method of treating citrus pulp to increase the nutritional value thereof, the steps of treating citrus pulp having substantially all of the water removed therefrom with anhydrous ammonia to form an ammoniated citrus pulp having a protein substitute content available to ruminants for nutritional purposes in addition to the natural protein content present in said citrus pulp, adding an extracting medium having a pH less than 7 selected from the group consisting of peel liquor and acidified water, dewatering the resultant slurry from such extracting step to produce an ammoniated citrus pulp stream and an ammoniated extracting medium stream, said dewatering increasing the protein substitute content of said ammoniated extracting medium over and above that obtained by the extracting step alone, dehydrating said citrus pulp stream to produce a dry ammoniated citrus pulp, and dehydrating said ammoniated extracting medium stream to produce a concentrated protein extract, both of said dry ammoniated citrus pulp and said concentrated ammoniated extract having a nitrogen content available to plants.

13. In a method of treating citrus pulp to increase the nutritional value thereof, the steps of feeding citrus pulp having substantially all of the water removed therefrom to an ammoniation chamber, maintaining the pressure in said chamber from atmospheric to five pounds gauge pressure, adding liquid ammonia to said citrus pulp at a temperature sufficient to vaporize said ammonia to form an ammoniated citrus pulp having a substantial amount of nitrogen in combined form, and thereafter adding to said ammoniated citrus pulp an extracting medium having a pH less than 7 selected from the group consisting of peel liquor and acidified water so that said extracting medium acquires a portion of said nitrogen present in combined form in said ammoniated citrus pulp.

References Cited in the file of this patent
UNITED STATES PATENTS

| | | |
|---|---|---|
| 2,215,944 | Vincent | Sept. 24, 1940 |
| 2,293,845 | Miller | Aug. 25, 1942 |
| 2,458,679 | Buxton | Jan. 11, 1949 |
| 2,579,609 | Peebles et al. | Dec. 25, 1951 |
| 2,603,567 | Stiles | July 15, 1952 |